United States Patent
Wu et al.

(10) Patent No.: US 10,102,976 B2
(45) Date of Patent: Oct. 16, 2018

(54) MULTILAYER CAPACITOR

(71) Applicant: YAGEO CORPORATION, Kaohsiung (TW)

(72) Inventors: Ming-Chun Wu, Kaohsiung (TW); Cheng-Han Tsai, Kaohsiung (TW); I-Tsung Lin, Kaohsiung (TW)

(73) Assignee: YAGEO CORPORATION, Kaohsiung (TW)

( * ) Notice: Subject to any disclaimer, the term of this patent is extended or adjusted under 35 U.S.C. 154(b) by 0 days.

(21) Appl. No.: 15/470,475

(22) Filed: Mar. 27, 2017

(65) Prior Publication Data

US 2017/0287641 A1    Oct. 5, 2017

(30) Foreign Application Priority Data

Mar. 29, 2016  (TW) .............................. 105204329 U

(51) Int. Cl.
| | |
|---|---|
| *H01G 4/30* | (2006.01) |
| *H01G 4/012* | (2006.01) |
| *H01G 4/232* | (2006.01) |
| *H01G 4/242* | (2006.01) |

(52) U.S. Cl.
CPC .............. *H01G 4/30* (2013.01); *H01G 4/012* (2013.01); *H01G 4/232* (2013.01); *H01G 4/242* (2013.01)

(58) Field of Classification Search
CPC .......... H01G 4/30; H01G 4/012; H01G 4/232; H01G 4/242
See application file for complete search history.

(56) References Cited

U.S. PATENT DOCUMENTS

| | | | | |
|---|---|---|---|---|
| 3,740,624 | A * | 6/1973 | McAdams, Jr. ......... | H01G 4/30 361/303 |
| 6,282,079 | B1 * | 8/2001 | Nagakari ............... | H01G 4/232 361/303 |
| 6,441,459 | B1 * | 8/2002 | Togashi ................... | H01G 4/30 257/532 |
| 7,457,099 | B2 * | 11/2008 | Togashi ................ | H01G 4/012 361/303 |
| 7,495,885 | B2 * | 2/2009 | Togashi ................ | H01G 4/232 361/306.1 |
| 8,547,682 | B2 * | 10/2013 | Sasabayashi .......... | H01G 4/012 361/306.3 |
| 9,336,950 | B2 * | 5/2016 | Kim ....................... | H01G 4/012 |
| 2008/0310078 | A1 * | 12/2008 | Lee ........................ | H01G 4/232 361/306.3 |
| 2009/0213525 | A1 * | 8/2009 | Lee ........................ | H01G 4/005 361/303 |

(Continued)

*Primary Examiner* — Dion R Ferguson
(74) *Attorney, Agent, or Firm* — Muncy, Geissler, Olds & Lowe, P.C.

(57) ABSTRACT

A multilayer capacitor includes a dielectric main body having opposite first and second sides, a terminal electrode assembly and spaced apart first, second and third inner electrodes, all of which are disposed in the main body. The second inner electrode is disposed between the first and third inner electrodes. The terminal electrode assembly has a first terminal electrode unit disposed on the first side and connected to the first inner electrode, a second terminal electrode unit disposed on the second side and connected to the second inner electrode, and a third terminal electrode unit disposed on the first side and connected to the third inner electrode. The first, second and third terminal electrode units are insulated from each other.

11 Claims, 9 Drawing Sheets

(56) References Cited

U.S. PATENT DOCUMENTS

| | | | |
|---|---|---|---|
| 2014/0160617 A1* | 6/2014 | Kim | H01G 4/00 |
| | | | 361/301.4 |
| 2014/0375173 A1* | 12/2014 | Hamanaka | H01L 41/0472 |
| | | | 310/363 |
| 2017/0229244 A1* | 8/2017 | Nakazawa | H01G 4/12 |

* cited by examiner

MULTILAYER CAPACITOR

CROSS-REFERENCE TO RELATED APPLICATION

This application claims priority of Taiwanese Utility Model Patent Application No. 105204329, filed on Mar. 29, 2016.

FIELD

The disclosure relates to a capacitor, and more particularly to a multilayer capacitor including multiple terminal electrodes.

BACKGROUND

The current trend in electronic devices is miniaturization, where even the electronic components mounted on the circuit board of the electronic device, such as passive components, are miniaturized.

A conventional multilayer ceramic capacitor (MLCC) includes a dielectric main body, a plurality of inner electrode layers mounted in the dielectric main body and spaced apart from each other, and two terminal electrodes disposed on opposite sides of the dielectric main body and electrically connected to the inner electrode layers. With such structural design, the conventional MLCC has a fixed capacitance. Therefore, when the conventional MLCCs having various capacitance values are intended to be used together, these MLCCs have to be connected in parallel or in series. However, the structure of the MLCCs connected in parallel or in series is determined in the design stage, and limits adaptability in different applications. In addition, further miniaturization of the electronic device will be limited by mounting of the MLCCs connected in parallel or in series on the circuit board.

SUMMARY

Therefore, an object of the present disclosure is to provide a multilayer capacitor that can alleviate at least one of the drawbacks associated with the prior art.

An aspect of the present disclosure provides a multilayer capacitor that includes a main body, a first inner electrode, a second inner electrode, a third inner electrode and a terminal electrode assembly.

The main body has a first side and a second side opposite to the first side, and is made of a dielectric material. The first inner electrode is disposed in the main body. The second inner electrode is disposed in the main body and is spaced apart from the first inner electrode. The third inner electrode is disposed in the main body and is spaced apart from the second inner electrode. The second inner electrode is disposed between the first inner electrode and the third inner electrode. The terminal electrode assembly has a first terminal electrode unit that is disposed on the first side of the main body and is electrically connected to the first inner electrode, and a second terminal electrode unit that is disposed on the second side of the main body and is electrically connected to the second inner electrode. The third terminal electrode unit is disposed on the first side of the main body and is electrically connected to the third inner electrode. The first, second and third terminal electrode units are spaced apart and electrically insulated from each other.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Figure 1:
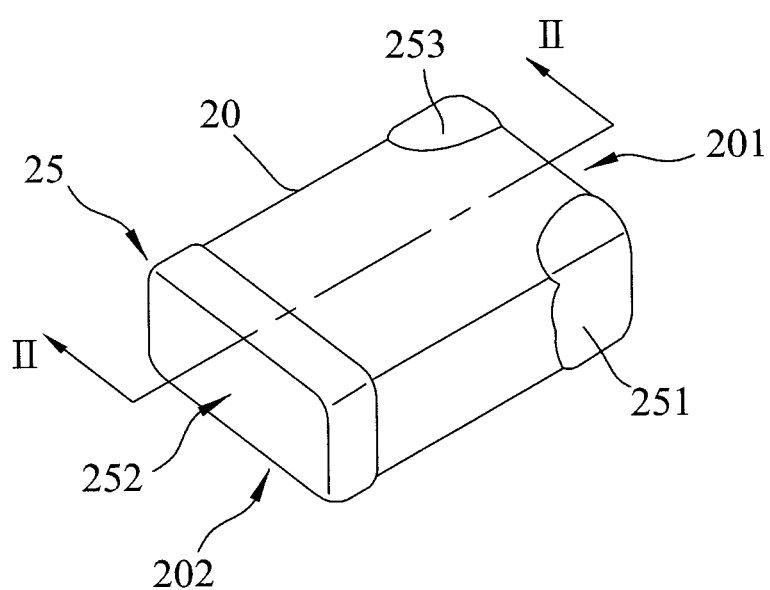
FIG. 1 is a perspective view of a first embodiment of a multilayer capacitor according to the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
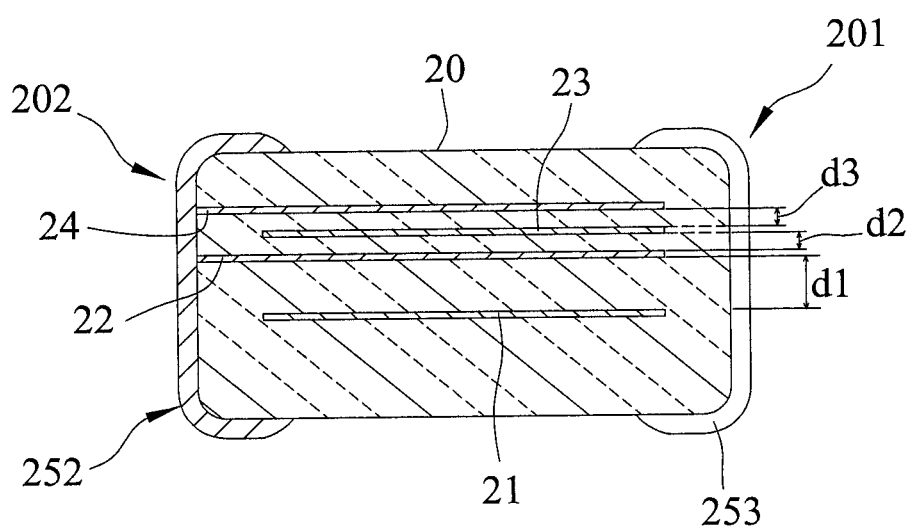
FIG. 2 is a cross-sectional view of the first embodiment taken along line II-II of FIG. 1.
Figure 3:
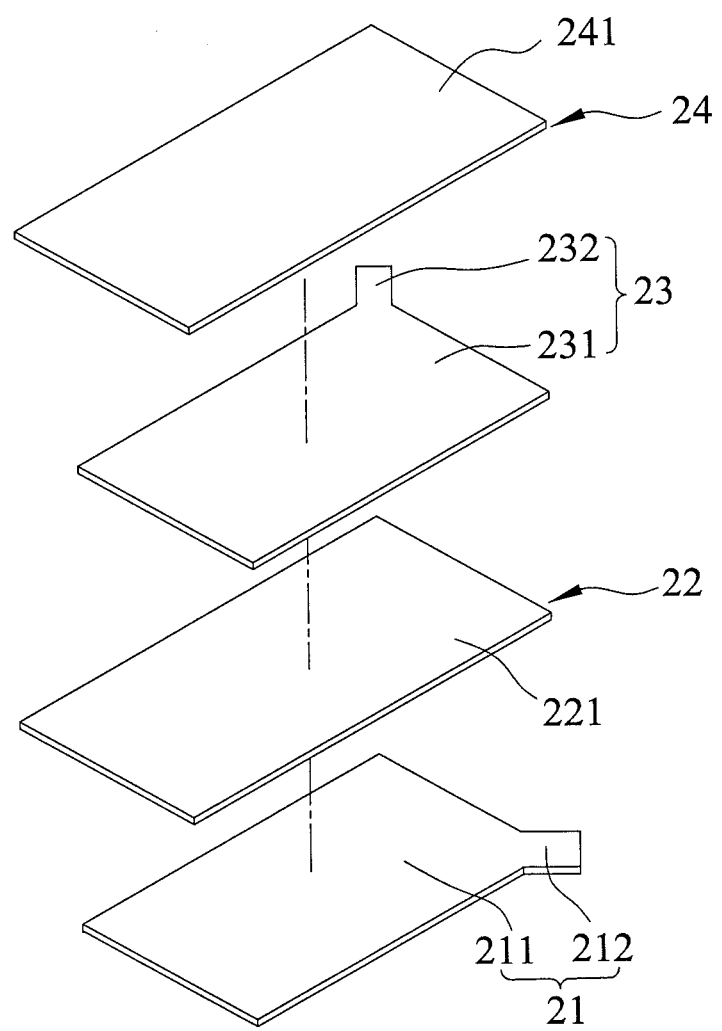
FIG. 3 is a schematic view showing a plurality of inner electrodes of the first embodiment.

Referring to FIGS. 1 to 3, a first embodiment of a multilayer capacitor includes a main body 20, a first inner electrode 21, a second inner electrode 22, a third inner electrode 23, a fourth inner electrode 24 and a terminal electrode assembly 25.

The main body 20 has a first side 201 and a second side 202 opposite to the first side 201, and is made of a dielectric material.

The first inner electrode 21 is disposed in the main body 20. The second inner electrode 22 is disposed in the main body 20 and is spaced apart from the first inner electrode 21. The third inner electrode 23 is disposed in the main body 20 and is spaced apart from the second inner electrode 22. The second inner electrode 22 is disposed between the first inner electrode 21 and the third inner electrode 23. The fourth inner electrode 24 is disposed in the main body 20 and is spaced apart from the third inner electrode 23. The third inner electrode 23 is disposed between the second inner electrode 22 and the fourth inner electrode 24.

In this embodiment, the second inner electrode 22 is spaced apart from the first inner electrode 21 by a first distance (d1). The third inner electrode 23 is spaced apart from the second inner electrode 22 by a second distance (d2). The fourth inner electrode 24 is spaced apart from the third inner electrode 23 by a third distance (d3). The first distance (d1) is different from the second and third distances (d2, d3). In certain embodiments, the second distance (d2) is equal to the third distance (d3), and the first distance (d1) is larger than the second and third distances (d2, d3). In certain embodiments, the second distance (d2) is different from the third distance (d3), and the first distance (d1) is larger than the second and third distances (d2, d3). The capacitance value between two electrodes is inversely proportional to the distance between two electrodes with constant surface area.

Therefore, by changing the distance between electrodes based on practical requirements, the capacitance value can be changed accordingly.

The terminal electrode assembly 25 has a first terminal electrode unit 251, a second terminal electrode unit 252 and a third terminal electrode unit 253. The first terminal electrode unit 251 is disposed on the first side 201 of the main body 20 and is electrically connected to the first inner electrode 21. The second terminal electrode unit 252 is disposed on the second side 202 of the main body 20 and is electrically connected to the second and fourth inner electrodes 22, 24. The third terminal electrode unit 253 is disposed on the first side 201 of the main body 20 and is electrically connected to the third inner electrode 23. The first, second and third terminal electrode units 251, 252, 253 are spaced apart and electrically insulated from each other.

In this embodiment, the main body 20 is substantially rectangular shaped. The first inner electrode 21 has a first inner electrode layer 211 that is substantially rectangular shaped, and a first inner electrode extension 212 that extends from a corner of the first inner electrode layer 211, which is adjacent to the first terminal electrode unit 251, and that is electrically connected to the first terminal electrode unit 251. The second inner electrode 22 has a second inner electrode layer 221 that is substantially rectangular shaped, that extends toward the second side 202 of the main body 20, and that is electrically connected to the second terminal electrode unit 252. The third inner electrode 23 has a third inner electrode layer 231 that is substantially rectangular shaped, and a third inner electrode extension 232 that extends from a corner of the third inner electrode layer 231, which is adjacent to the third terminal electrode unit 253, and that is electrically connected to the third terminal electrode unit 253. The fourth inner electrode 24 has a fourth inner electrode layer 241 that is substantially rectangular shaped, that extends toward the second side 202 of the main body 20, and that is electrically connected to the second terminal electrode unit 252.

In this embodiment, a normal projection of the third inner electrode extension 232 of the third inner electrode 23 on a plane of the first inner electrode 21 is staggered with respect to the first inner electrode extension 212 of the first inner electrode 21.

In certain embodiments, the first inner electrode extension 212 of the first inner electrode 21 extends from the first inner electrode layer 211 outwardly of the main body 20 to form the first terminal electrode unit 251. The third inner electrode extension 232 of the third inner electrode 23 extends from the third inner electrode layer 231 outwardly of the main body 20 to form the third terminal electrode unit 253.

Figure 4:
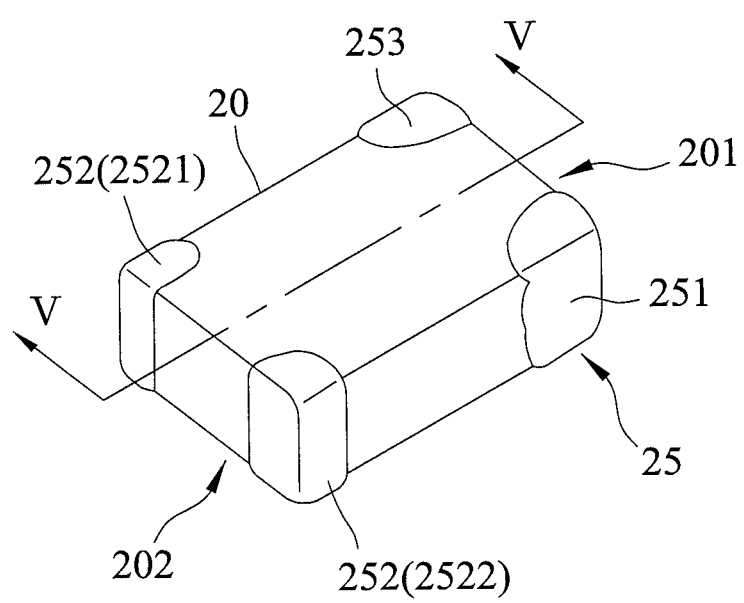
FIG. 4 is a perspective view of a second embodiment of the multilayer capacitor according to the present disclosure.
Figure 5:
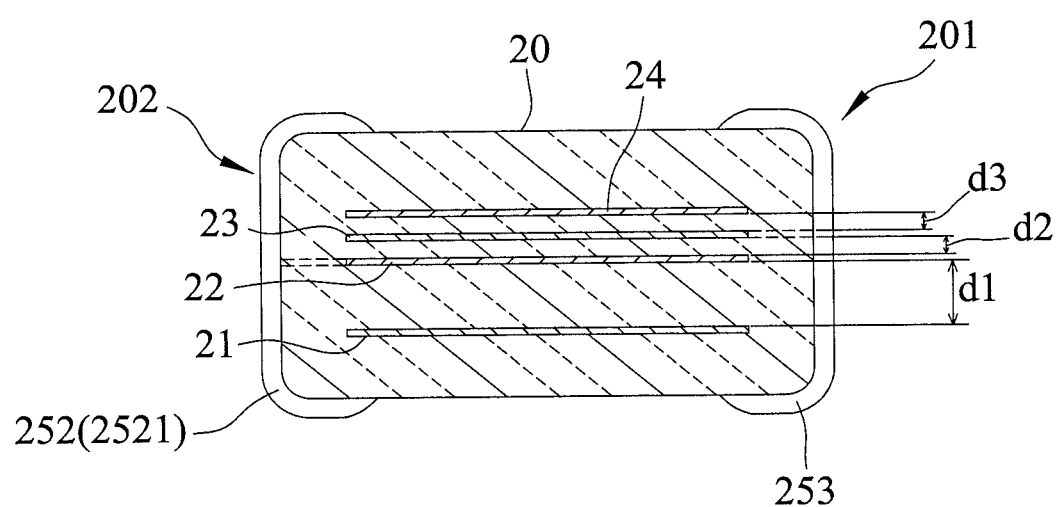
FIG. 5 is a cross-sectional view of the second embodiment taken along line V-V of FIG. 4.
Figure 6:
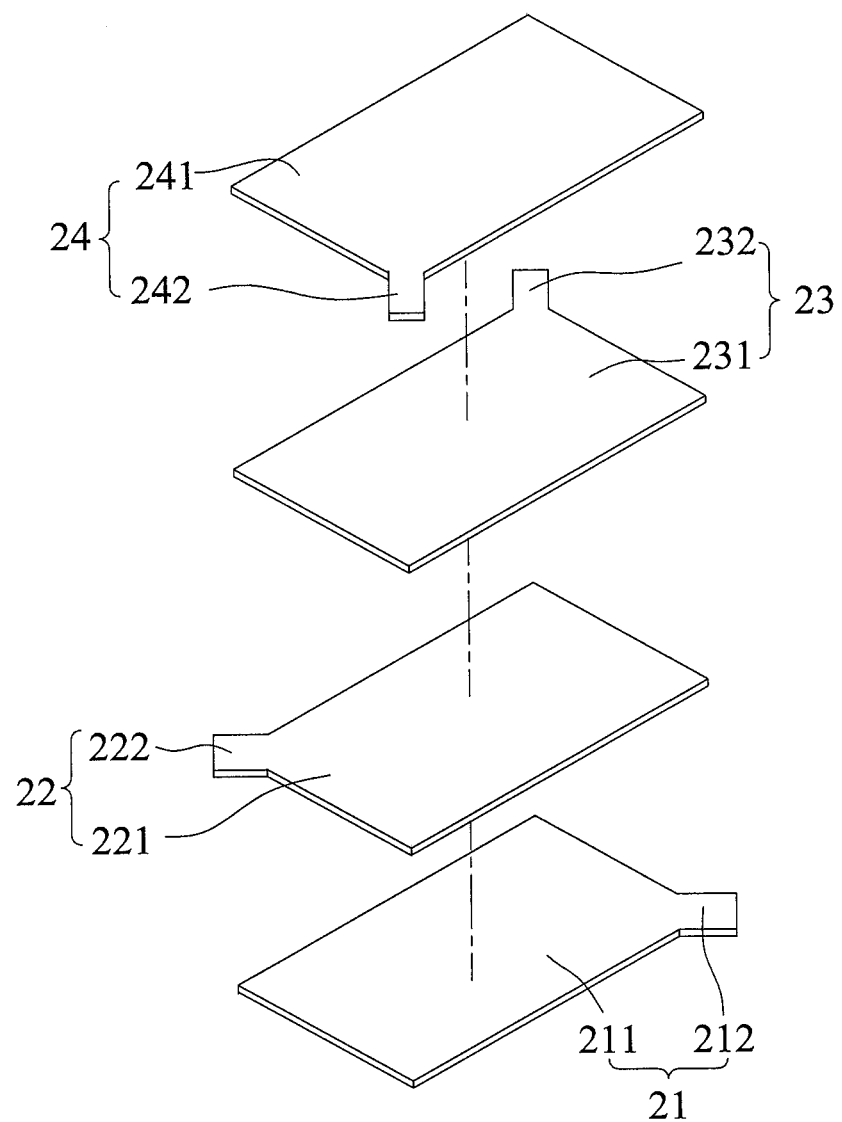
FIG. 6 is a schematic view showing a plurality of inner electrodes of the first embodiment.

Referring to FIGS. 4 to 6, a second embodiment of the multilayer capacitor according to the present disclosure has a structure modified based on that of the first embodiment.

In the second embodiment, the second terminal unit 252 includes two sub-electrodes 2521, 2522 separately disposed on the second side 202 of the main body 20. The two sub-electrodes 2521, 2522 are electrically insulated from each other. The second inner electrode 22 further has a second inner electrode extension 222 that extends from a corner of the second inner electrode layer 221, which is adjacent to the sub-electrode 2521, and that is electrically connected to the sub-electrode 2521 of the second terminal electrode unit 252. The fourth inner electrode 24 further has a fourth inner electrode extension 242 that extends from a corner of the fourth inner electrode layer 241, which is adjacent to the sub-electrode 2522, and that is electrically connected to the sub-electrode 2522 of the second terminal electrode unit 252.

In this embodiment, normal projections of the fourth inner electrode extension 242 of the fourth inner electrode 24, the third inner electrode extension 232 of the third inner electrode 23 and the second inner electrode extension 222 of the second inner electrode 22 on the plane of the first inner electrode 21 is staggered with respect to the first inner electrode extension 212 of the first inner electrode 21.

Figure 7:
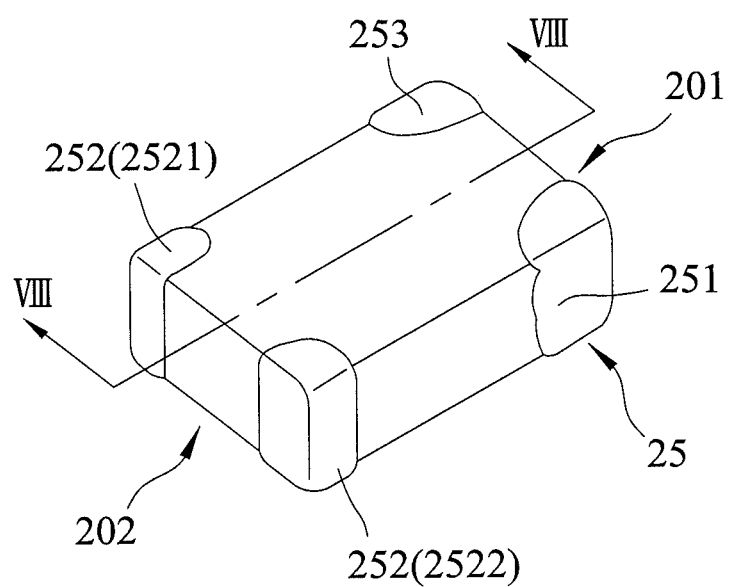
FIG. 7 is a perspective view of a third embodiment of the multilayer capacitor according to the present disclosure.
Figure 8:
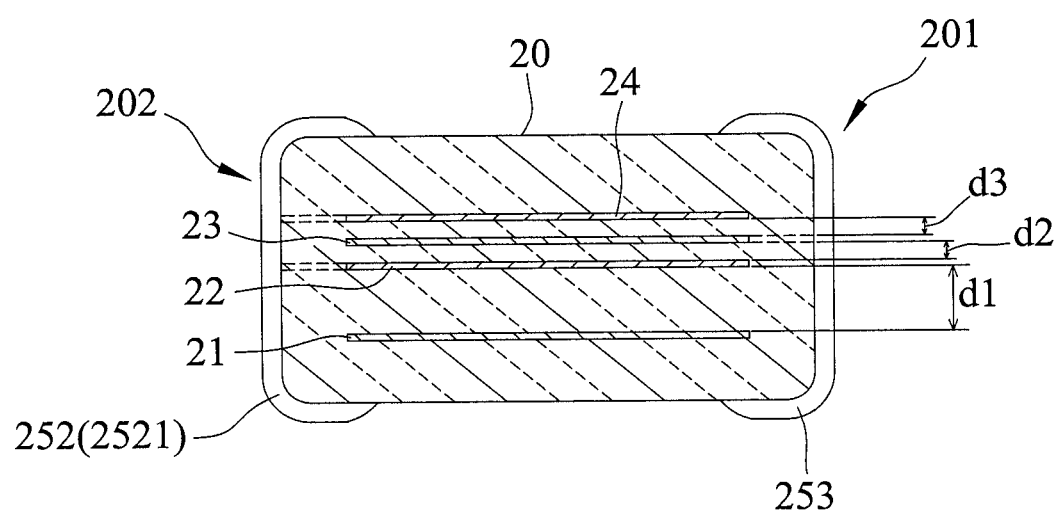
FIG. 8 is a cross-sectional view of the third embodiment taken along line VIII-VIII of FIG. 7.
Figure 9:
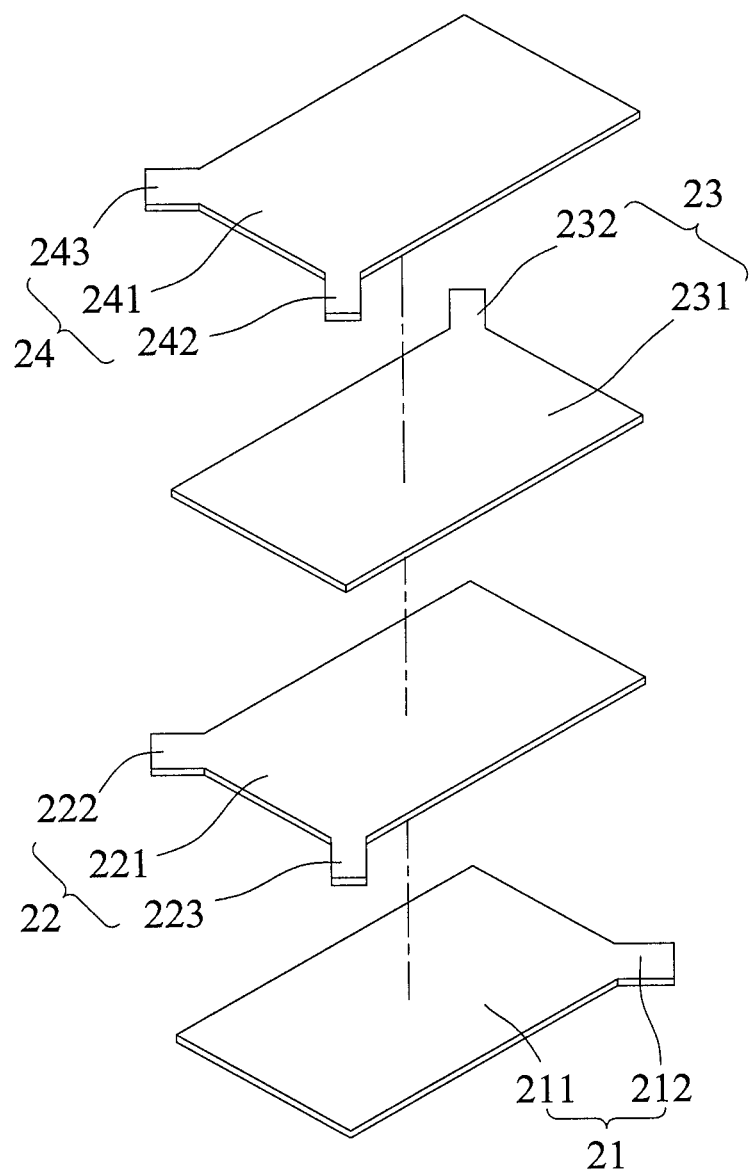
FIG. 9 is a schematic view showing a plurality of inner electrodes of the third embodiment.

Referring to FIGS. 7 to 9, a third embodiment of the multilayer capacitor according to the present disclosure has a structure modified based on that of the second embodiment.

In the third embodiment, the second inner electrode 22 has two of the second inner electrode extensions 222, 223 that respectively extend from opposite corners of the second inner electrode layer 221, which are respectively adjacent to the sub-electrodes 2521, 2522, and that are respectively and electrically connected to the sub-electrodes 2521, 2522 of the second terminal electrode unit 252. The fourth inner electrode 24 has two fourth inner electrode extensions 242, 243 that respectively extend from opposite corners of the fourth inner electrode layer 241, which are respectively adjacent to the sub-electrodes 2521, 2522, and that are respectively and electrically connected to the sub-electrodes 2521, 2522 of the second terminal electrode unit 252.

In this embodiment, normal projections of the fourth inner electrode extensions 242, 243 on a plane respectively coincide with normal projections of the second inner electrode extensions 222, 223 on the plane.

It should be noted that the number of the inner electrodes may be at least three for achieving multiple capacitance values when in use, as long as all the inner electrodes are electrically connected to the terminal electrode assembly 25 based on actual designs and requirements.

The multilayer capacitor of this disclosure includes at least three terminal electrodes (i.e., the first, second and third terminal electrode units 251, 252, 253), and at least three inner electrodes (i.e., the first, second and third inner electrodes 21, 22, 23) that are correspondingly connected to the at least three terminal electrodes, thereby achieving multiple capacitance values when in use while maintaining a compact overall size.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiment and modifications but is intended to cover various arrangements included within the spirit and scope of the broadest interpretation so as to encompass all such modifications and equivalent arrangements.

What is claimed is:

1. A multilayer capacitor comprising:
a main body that has a first side and a second side opposite to said first side, and that is made of a dielectric material;
a first inner electrode that is disposed in said main body;
a second inner electrode that is disposed in said main body and that is spaced apart from said first inner electrode;
a third inner electrode that is disposed in said main body and that is spaced apart from said second inner electrode, said second inner electrode being disposed between said first inner electrode and said third inner electrode;
a terminal electrode assembly that has
a first terminal electrode unit being disposed on said first side of said main body and being electrically connected to said first inner electrode, a second terminal electrode unit being disposed on said second side of said main body and being electrically connected to said second inner electrode, and
a third terminal electrode unit being disposed on said first side of said main body and being electrically connected to said third inner electrode; and
a fourth inner electrode that is disposed in said main body and that is spaced apart from said third inner electrode, said third inner electrode being disposed between said second inner electrode and said fourth inner electrode, said second terminal electrode unit being electrically connected to said fourth inner electrode,
wherein said first, second and third terminal electrode units are spaced apart and electrically insulated from each other.

2. The multilayer capacitor as claimed in claim 1, wherein:
said first inner electrode has a first inner electrode layer and a first inner electrode extension extending from said first inner electrode layer and being electrically connected to said first terminal electrode unit;
said second inner electrode has a second inner electrode layer electrically connected to said second terminal electrode unit;
said third inner electrode has a third inner electrode layer and a third inner electrode extension extending from said third inner electrode layer and being electrically connected to said third terminal electrode unit; and
said fourth inner electrode has a fourth inner electrode layer electrically connected to said second terminal electrode unit.

3. The multilayer capacitor as claimed in claim 2, wherein:
a normal projection of said third inner electrode extension of said third inner electrode on a plane of said first inner electrode is staggered with respect to said first inner electrode extension of said first inner electrode.

4. The multilayer capacitor as claimed in claim 1, wherein said first inner electrode has a first inner electrode layer and a first inner electrode extension extending from said first inner electrode layer outwardly of said main body to form said first terminal electrode unit.

5. The multilayer capacitor as claimed in claim 1, wherein said third inner electrode has a third inner electrode layer and a third inner electrode extension extending from said third inner electrode layer outwardly of said main body to form said third terminal electrode unit.

6. The multilayer capacitor as claimed in claim 2, wherein:
said second terminal electrode unit includes two sub-electrodes separately disposed on said second side of said main body, said two sub-electrodes being electrically insulated from each other;
said second inner electrode further has at least one second inner electrode extension extending from said second inner electrode layer and being electrically connected to one of said sub-electrodes of said second terminal electrode unit; and
said fourth inner electrode further has at least one fourth inner electrode extension extending from said fourth inner electrode layer and being electrically connected to the other of said sub-electrodes of said second terminal electrode unit.

7. The multilayer capacitor as claimed in claim 6, wherein:
said second inner electrode has two of said second inner electrode extensions extending from said second inner electrode layer and being respectively and electrically connected to said sub-electrodes of said second terminal electrode unit; and
said fourth inner electrode has two of said fourth inner electrode extensions extending from said fourth inner electrode layer and being respectively and electrically connected to said sub-electrodes of said second terminal electrode unit.

8. The multilayer capacitor as claimed in claim 7, wherein normal projections of said fourth inner electrode extensions on a plane respectively coincide with normal projections of said second inner electrode extensions on the plane.

9. The multilayer capacitor as claimed in claim 1, wherein said second inner electrode is spaced apart from said first inner electrode by a first distance, said third inner electrode being spaced apart from said second inner electrode by a second distance, said fourth inner electrode being spaced apart from said third inner electrode by a third distance, the first distance being different from the second and third distances.

10. The multilayer capacitor as claimed in claim 9, wherein the second distance is equal to the third distance, and the first distance is larger than the second and third distances.

11. The multilayer capacitor as claimed in claim 9, wherein the second distance is different from the third distance, and the first distance is larger than the second and third distances.

* * * * *